US012186865B2

(12) United States Patent
Murui et al.

(10) Patent No.: US 12,186,865 B2
(45) Date of Patent: Jan. 7, 2025

(54) ELECTRIC TOOL SYSTEM, CONTROL METHOD, AND PROGRAM

(71) Applicant: Panasonic Intellectual Property Management Co., Ltd., Osaka (JP)

(72) Inventors: Itaru Murui, Nara (JP); Shota Fujii, Osaka (JP); Kotaro Momoeda, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 17/919,098

(22) PCT Filed: Feb. 10, 2021

(86) PCT No.: PCT/JP2021/004906
§ 371 (c)(1),
(2) Date: Oct. 14, 2022

(87) PCT Pub. No.: WO2021/215083
PCT Pub. Date: Oct. 28, 2021

(65) Prior Publication Data

US 2023/0158646 A1 May 25, 2023

(30) Foreign Application Priority Data

Apr. 23, 2020 (JP) ................................ 2020-076942

(51) Int. Cl.
*B25B 23/147* (2006.01)
*B25F 5/00* (2006.01)

(52) U.S. Cl.
CPC ............ *B25B 23/147* (2013.01); *B25F 5/001* (2013.01)

(58) Field of Classification Search
CPC .............................. B25B 23/147; B25F 5/001
See application file for complete search history.

(56) References Cited

U.S. PATENT DOCUMENTS 9,054,623 B2 * 6/2015 Sasaki ................. H02P 21/0089
2013/0175961 A1 7/2013 Suzuki et al.
(Continued)

FOREIGN PATENT DOCUMENTS

JP 2004-291143 A 10/2004
JP 2012-071390 A 4/2012
(Continued)

OTHER PUBLICATIONS

Extended European Search Report dated Nov. 24, 2023 issued in the corresponding European Patent Application No. 21793070.0.
(Continued)

*Primary Examiner* — Robert F Long
*Assistant Examiner* — Xavier A Madison
(74) *Attorney, Agent, or Firm* — Rimon P.C.

(57) ABSTRACT

An electric tool system includes: a motor; an output shaft to be coupled to a tip tool; a transmission mechanism that transmits motive power of the motor to the output shaft; an acquirer that acquires, based on a current flowing through the motor, a torque value related to output torque provided by the tip tool; and a controller that has a torque management mode in which the controller controls the motor in accordance with an operating command entered by a user through a trigger switch and prevents the torque value from exceeding an upper limit value. The controller controls, when finding a predetermined condition satisfied in the torque management mode, a velocity of the motor into a predetermined restriction value irrespective of a manipulative variable of the trigger switch. The predetermined condition includes a condition that the torque value reach a threshold value smaller than the upper limit value.

13 Claims, 7 Drawing Sheets

(56) References Cited

U.S. PATENT DOCUMENTS

| | | | | |
|---|---|---|---|---|
| 2014/0367134 | A1* | 12/2014 | Phillips | B25B 23/147 173/176 |
| 2016/0354888 | A1* | 12/2016 | Huber | B25F 5/001 |
| 2020/0047321 | A1* | 2/2020 | Heimrich | B25F 5/001 |
| 2020/0070325 | A1 | 3/2020 | Miyazaki | |

FOREIGN PATENT DOCUMENTS

| | | | |
|---|---|---|---|
| JP | 2012-139800 | A | 7/2012 |
| JP | 2013-252576 | A | 12/2013 |
| JP | 2020-032504 | A | 3/2020 |

OTHER PUBLICATIONS

International Search Report dated Apr. 6, 2021 issued in International Patent Application No. PCT/JP2021/004906, with English translation.

* cited by examiner

ELECTRIC TOOL SYSTEM, CONTROL METHOD, AND PROGRAM

CROSS-REFERENCE OF RELATED APPLICATIONS

This application is the U.S. National Phase under 35 U.S.C. § 371 of International Patent Application No. PCT/JP2021/004906, filed on Feb. 10, 2021, which in turn claims the benefit of Japanese Application No. 2020-076942, filed on Apr. 23, 2020, the entire disclosures of which Applications are incorporated by reference herein.

TECHNICAL FIELD

The present disclosure generally relates to an electric tool system, a control method, and a program. More particularly, the present disclosure relates to an electric tool system including a motor, a control method for controlling the electric tool system, and a program.

BACKGROUND ART

Patent Literature 1 discloses an electric tool, which uses electronic clutch control as a control method. According to the electronic clutch control, when rotational torque detected by a torque detection means becomes equal to or greater than a predetermined torque setting value, rotation of the motor is stopped.

The electronic clutch control allows the user to change the torque setting value. Specifically, according to the electronic clutch control, the torque setting values corresponding to nine stages are provided to allow the user to select any one of these torque setting values. In addition, according to the electronic clutch control, the maximum number of revolutions is defined for each of these torque setting values in the nine stages. Thus, according to the electronic clutch control, when the user selects any one of the torque setting values 1 to 9, the controller performs control with the maximum number of revolutions, which is defined for the torque setting value selected, set as an upper limit. When finding the rotational torque detected equal to or greater than the torque setting value, the controller makes the motor stop running compulsorily irrespective of the number of revolutions at that point in time, even if the trigger switch has been pulled.

CITATION LIST

Patent Literature

Patent Literature 1: JP 2012-139800 A

SUMMARY OF INVENTION

An object of the present disclosure is to improve the user-friendliness.

An electric tool system according to an aspect of the present disclosure includes a motor, an output shaft, a transmission mechanism, an acquirer, a trigger switch, and a controller. The output shaft is to be coupled to a tip tool. The transmission mechanism transmits motive power of the motor to the output shaft. The acquirer acquires, based on a current flowing through the motor, a torque value related to output torque provided by the tip tool. The trigger switch accepts an operating command entered by a user. The controller has a torque management mode in which the controller controls the motor in accordance with the operating command entered through the trigger switch and prevents the torque value acquired by the acquirer from exceeding an upper limit value. The controller controls, when finding a predetermined condition satisfied in the torque management mode, the motor to turn a velocity of the motor into a predetermined restriction value irrespective of a manipulative variable of the trigger switch. The predetermined condition includes a condition that the torque value acquired by the acquirer reach a threshold value smaller than the upper limit value.

A control method according to another aspect of the present disclosure is a control method for controlling an electric tool system. The electric tool system includes a motor, an output shaft, a transmission mechanism, an acquirer, and a trigger switch. The output shaft is to be coupled to a tip tool. The transmission mechanism transmits motive power of the motor to the output shaft. The acquirer acquires, based on a current flowing through the motor, a torque value related to output torque provided by the tip tool. The trigger switch accepts an operating command entered by a user. The control method includes controlling the motor in a torque management mode in which the motor is controlled in accordance with the operating command entered through the trigger switch and the torque value acquired by the acquirer is prevented from exceeding an upper limit value. The control method further includes controlling, when finding a predetermined condition satisfied in the torque management mode, the motor to turn a velocity of the motor into a predetermined restriction value irrespective of a manipulative variable of the trigger switch. The predetermined condition includes a condition that the torque value acquired by the acquirer reach a threshold value smaller than the upper limit value.

A program according to still another aspect of the present disclosure is designed to cause one or more processors to perform the control method described above.

DESCRIPTION OF EMBODIMENTS

Next, an electric tool system 100 according to an exemplary embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

(1) OVERVIEW

Figure 1:
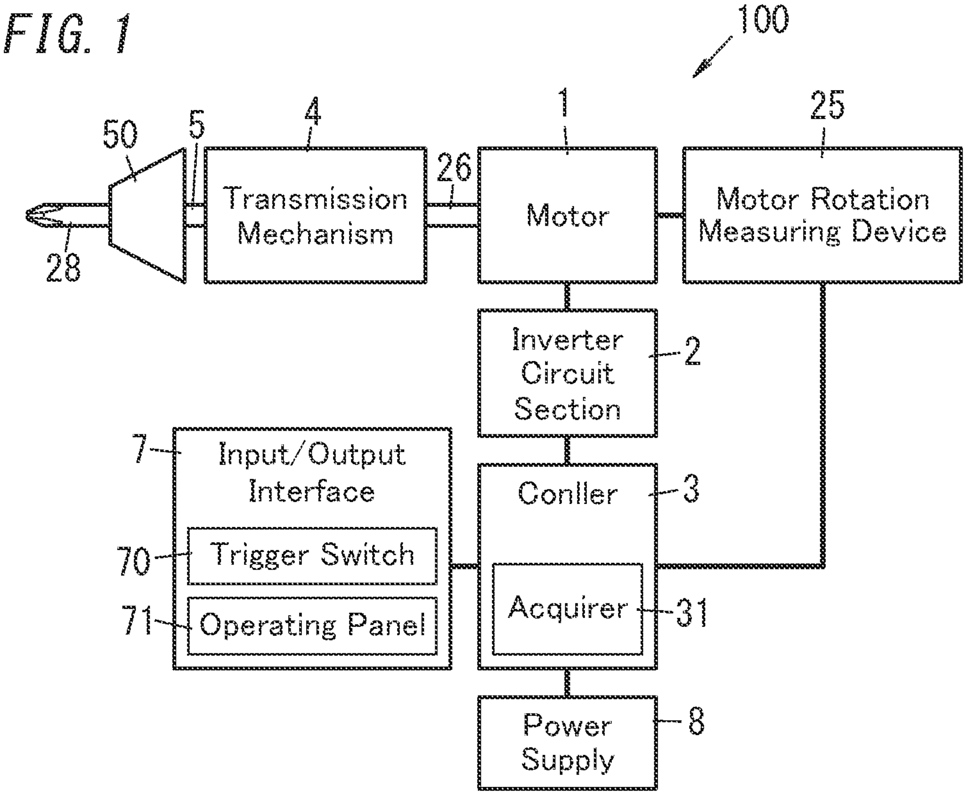
FIG. 1 is a schematic representation of an electric tool system according to an exemplary embodiment.
Figure 2:
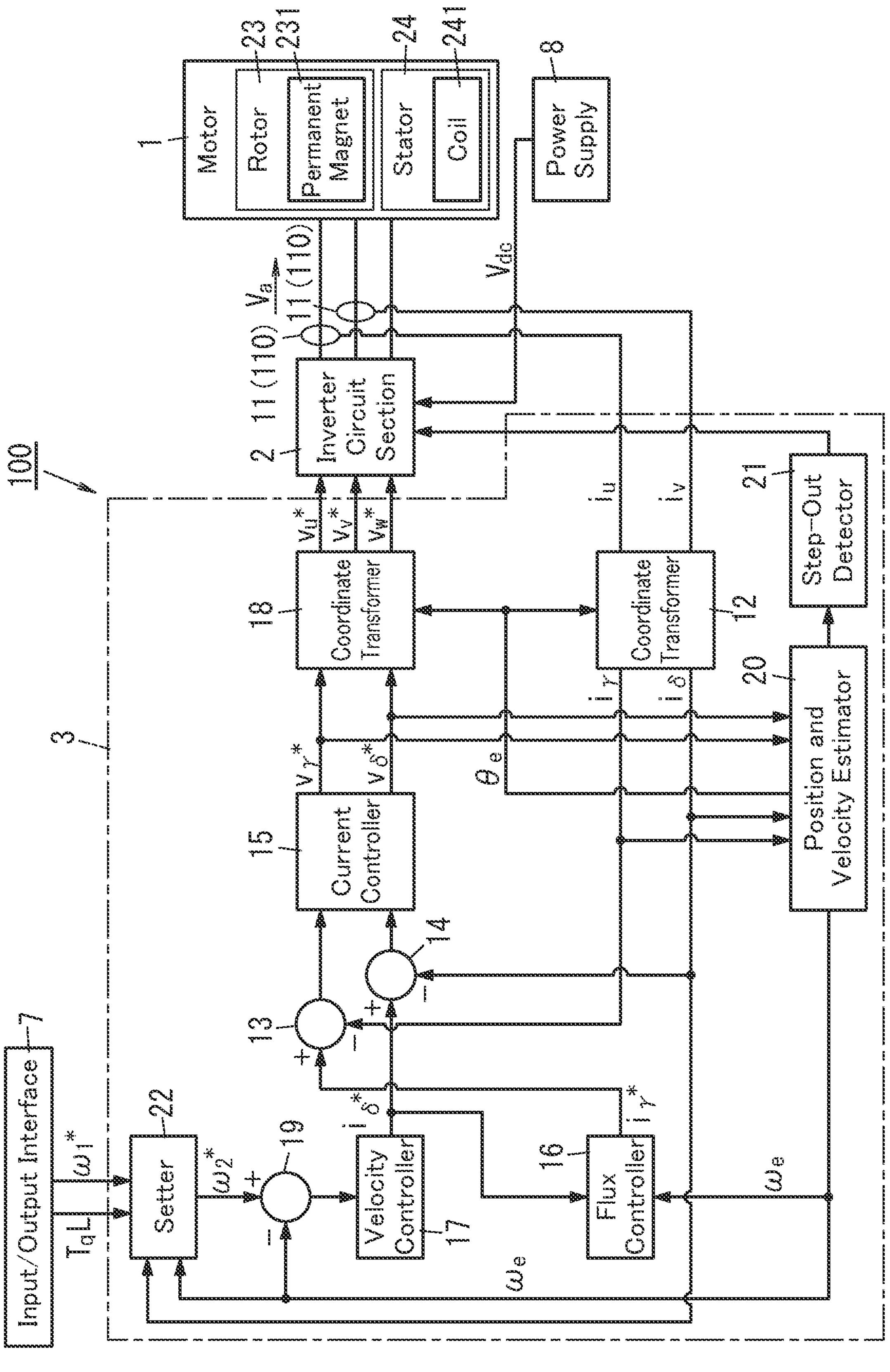
FIG. 2 is a block diagram of the electric tool system.

As shown in FIGS. 1 and 2, the electric tool system 100 includes a motor 1, an output shaft 5, a transmission mechanism 4, an acquirer 31, a trigger switch 70, a controller 3, and a power supply 8. In this embodiment, the acquirer 31 is provided for the controller 3.

The motor 1 runs (rotates) with the power supplied from the power supply 8 under the control of the controller 3.

The output shaft 5 is to be coupled to a tip tool 28.

The transmission mechanism 4 transmits motive power of the motor 1 to the output shaft 5.

The acquirer 31 acquires, based on a current flowing through the motor 1, a torque value Tq1 related to output torque provided by the tip tool 28.

The trigger switch 70 accepts an operating command entered by the user.

The controller 3 controls the motor 1.

In the electric tool system 100, the controller 3 has a torque management mode as an operation mode. In the torque management mode, the controller 3 controls the motor 1 in accordance with the operating command entered through the trigger switch 70 and also prevents the torque value Tq1 acquired by the acquirer 31 from exceeding an upper limit value TqL. That is to say, in the torque management mode, so-called "electronic clutch control" in which the motor 1 is stopped when the torque value Tq1 reaches the upper limit value TqL is realized. In the following description, the torque management mode will be hereinafter referred to as an "electronic clutch mode."

Furthermore, in the electric tool system 100 according to this embodiment, the controller 3 controls, when finding a predetermined condition satisfied in the electronic clutch mode, the motor 1 to turn a velocity (rotational velocity or number of revolutions) of the motor 1 into a predetermined restriction value ωc irrespective of a manipulative variable of the trigger switch 70. The predetermined condition includes a condition that the torque value Tq1 acquired by the acquirer 31 reach a threshold value smaller than the upper limit value TqL. Thus, in this electric tool system 100, before the motor 1 is stopped in response to the torque value Tq1 reaching the upper limit value TqL, the velocity of the motor 1 is controlled into a restriction value ωc in response to the torque value Tq1 reaching the threshold value. That is to say, in this electric tool system 100, it is not until the control of making the velocity of the motor 1 approach the restriction value ωc has been performed that the motor 1 is stopped. This enables reducing a dispersion in the velocity of the motor 1 just before the motor 1 is stopped. This enables, when fastening work (such as the work of tightening a screw) is performed on a fastening member (such as a screw) using the tip tool 28, for example, reducing a dispersion in the fastening torque to be output to the fastening member. This improves the user-friendliness of the electric tool system 100.

Figure 5:
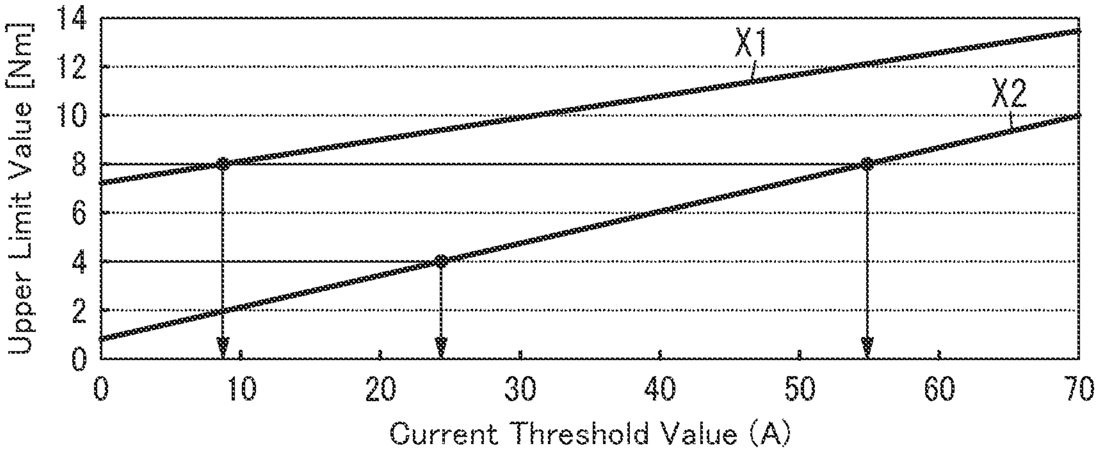
FIG. 5 is a graph showing a relationship between the current threshold value and upper limit value of the electric tool system.

If a motor rotating at relatively high velocities is made to stop running, then the electronic clutch control sometimes cannot be performed due to the inertia of the motor. FIG. 5 shows an exemplary relationship between the upper limit value TqL and the current threshold value in the electronic clutch control. As used herein, the "current threshold value" refers to a threshold value at which the controller 3 makes the motor stop running when a current flowing through the motor reaches this threshold value. In FIG. 5, "X1" indicates the characteristic in a situation where the motor velocity is 23500 [rpm] and "X2" indicates the characteristic in a situation where the motor velocity is 900 [rpm].

For example, if the upper limit value TqL is set at a value of 8 [Nm] in a situation where the motor velocity is 900 [rpm], the controller decides, when finding the current flowing through the motor has reached 54 [A], that the output torque have reached the upper limit value TqL as shown in FIG. 5. On the other hand, if the upper limit value TqL is set at a value of 4 [Nm] in a situation where the motor velocity is 900 [rpm], the controller decides, when finding the current flowing through the motor has reached 24 [A], that the output torque have reached the upper limit value TqL.

That is to say, according to the electronic clutch control, if the motor velocity is constant, then there is a linear relationship between the upper limit value TqL and the current threshold value. The output torque of the motor depends on the current flowing through the motor. Thus, setting the current threshold value at a value that increases as the upper limit value TqL increases allows increasing the final output torque to be provided from the output shaft when the motor is stopped.

Also, as shown in FIG. 5, if the upper limit value TqL is set at a value of 8 [Nm] in a situation where the motor velocity is 23500 [rpm], the controller decides, when finding the current flowing through the motor has reached 9 [A], that the output torque have reached the upper limit value TqL.

That is to say, according to the electronic clutch control, the current threshold value with respect to the same upper limit value TqL (of 8 [Nm] in this example) decreases as the motor velocity increases. This phenomenon is caused by the motor inertia (i.e., the characteristic of the motor that causes the motor to keep rotating).

That is why if the motor velocity is 23500 rpm, for example, then there is no current threshold value corresponding to a situation where the upper limit value TqL is set at a value of 4 Nm (i.e., the current threshold value becomes a negative value). In short, if the motor velocity is relatively high, then the electronic clutch control cannot be performed due to the motor inertia (i.e., its inertia moment).

To overcome this problem, the maximum number of revolutions may be set on an individual basis with respect to each of a plurality of torque setting values (upper limit values TqL) as in the electric tool of Patent Literature 1, for example. In that case, however, if the upper limit value TqL is a relatively small value, then the maximum number of revolutions will also be set at a relatively small value. This causes a decrease in work rate and an increase in work time.

In the electric tool system 100 according to this embodiment, the controller 3 controls, when finding a predetermined condition satisfied, the motor 1 to turn the number of revolutions of the motor 1 into a predetermined restriction value ωc irrespective of the manipulative variable of the trigger switch 70. Then, the controller 3 controls the velocity of the motor 1 according to the manipulative variable of the trigger switch 70 until the predetermined condition is satisfied. This enables shortening the work time and thereby improving the user-friendliness, compared to the electric tool of Patent Literature 1.

(2) DETAILS (2.1) Electric Tool System

Next, an electric tool system 100 according to this embodiment will be described in further detail with reference to the accompanying drawings. The electric tool system 100 according to this embodiment is an electric drill-screwdriver.

As shown in FIGS. 1 and 2, the electric tool system 100 includes a motor 1, an inverter circuit section 2, a controller 3, a transmission mechanism 4, an output shaft 5, an input/output interface 7, a power supply 8, a current measuring device 110, and a motor rotation measuring device 25.

The motor 1 is a brushless motor. In particular, the motor 1 according to this embodiment is a synchronous motor. More specifically, the motor 1 may be a permanent magnet synchronous motor (PMSM). As shown in FIG. 2, the motor 1 includes a rotor 23 having a permanent magnet 231 and a stator 24 having a coil 241. The rotor 23 includes a rotary shaft 26 that outputs rotational power. The rotor 23 rotates with respect to the stator 24 due to electromagnetic interaction between the coil 241 and the permanent magnet 231.

The power supply 8 is a power supply for use to drive the motor 1. The power supply 8 is a DC power supply. In this embodiment, the power supply 8 includes a secondary battery. The power supply 8 is a so-called "battery pack." The power supply 8 may also be used as a power supply for the inverter circuit section 2 and the controller 3.

The inverter circuit section 2 is a circuit for driving the motor 1. The inverter circuit section 2 converts a voltage $V_{dc}$ supplied from the power supply 8 to a drive voltage Va for the motor 1. In this embodiment, the drive voltage Va is a three-phase AC voltage including a U-phase voltage, a V-phase voltage, and a W-phase voltage. In the following description, the U-, V-, and W-phase voltages will be hereinafter designated by $v_u$, $v_v$, and $v_w$, respectively, as needed. These voltages $v_u$, $v_v$, and $v_w$ are sinusoidal voltages.

The inverter circuit section 2 may be implemented using a PWM inverter and a PWM converter. The PWM converter generates a pulse-width modulated PWM signal in accordance with target values (voltage command values) $v_u^*$, $v_v^*$, $v_w^*$ of the drive voltage $V_a$ (including the U-phase voltage $v_u$, the V-phase voltage $v_v$, and the W-phase voltage $v_w$). The PWM inverter applies a drive voltage Va ($v_u$, $v_v$, $v_w$) corresponding to the PWM signal to the motor 1, thereby driving the motor 1. More specifically, the PWM inverter includes half-bridge circuits corresponding to the three phases and a driver. In the PWM inverter, the driver turns ON and OFF a switching element in each half-bridge circuit in response to the PWM signal, thereby applying the drive voltage Va ($v_u$, $v_v$, $v_w$) according to the voltage command values $v_u^*$, $v_v^*$, $v_w^*$ to the motor 1. As a result, the motor 1 is supplied with a drive current corresponding to the drive voltage Va ($v_u$, $v_v$, $v_w$). The drive current includes a U-phase current $i_u$, a V-phase current $i_v$, and a W-phase current $i_w$. More specifically, the U-phase current $i_u$, the V-phase current $i_v$, and the W-phase current $i_w$ are respectively a current flowing through U-phase armature winding, a current flowing through V-phase armature winding, and a current flowing through W-phase armature winding in the stator 24 of the motor 1.

The current measuring device 110 includes two phase current sensors 11. In this embodiment, the two phase current sensors 11 respectively measure the U-phase current $i_u$ and the V-phase current $i_v$ out of the drive current supplied from the inverter circuit section 2 to the motor 1. Note that the W-phase current $i_w$ may be calculated based on the U-phase current $i_u$ and the V-phase current $i_v$. Alternatively, the current measuring device 110 may include a current detector that uses a shunt resistor, for example, instead of the phase current sensors 11.

The transmission mechanism 4 is provided between the rotary shaft 26 of the motor 1 and the output shaft 5. The transmission mechanism 4 transmits the motive power of the motor 1 to the output shaft 5. The transmission mechanism 4 may include, for example, a speed reducer mechanism which may change the gear ratio in response to an operation performed on a speed selector switch.

The output shaft 5 is a part to turn with the motive power of the motor 1. A tip tool 28 may be attached to the output shaft 5 via a chuck 50, for example.

The tip tool 28 rotates along with the output shaft 5. The electric tool system 100 turns the tip tool 28 by rotating the output shaft 5 with the driving force of the motor 1. In other words, the electric tool system 100 is a tool for driving the tip tool 28 with the driving force of the motor 1. Among various types of tip tools 28, a tip tool 28 is selected according to the intended use and attached to the chuck 50 for use. Alternatively, the tip tool 28 may be directly attached to the output shaft 5. Still alternatively, the output shaft 5 and the tip tool 28 may also be integrated together. Examples of the tip tool 28 include a screwdriver bit, a drill bit, and a socket. In this example, the tip tool 28 is a screwdriver bit.

The input/output interface 7 is a user interface. The input/output interface 7 includes devices for use to display information about the operation of the electric tool system 100, enter settings about the operation of the electric tool system 100, and operate the electric tool system 100.

In this embodiment, the input/output interface 7 includes a trigger switch (trigger volume) 70 and an operating panel 71 for accepting the user's operating command.

The trigger switch 70 is a type of push button switch. The ON/OFF states of the motor 1 may be switched by performing the operation of pulling the trigger switch 70. In addition, the target value $\omega_1^*$ of the velocity of the motor 1 may be changed by the manipulative variable of the operation of pulling the trigger switch 70. As a result, the velocity of the motor 1 and the output shaft 5 may be adjusted by the manipulative variable of the operation of pulling the trigger switch 70. The deeper the trigger switch 70 is pulled, the higher the velocity of the motor 1 and the output shaft 5 becomes.

More specifically, the trigger switch 70 includes a multi-stage switch or a continuously variable switch (variable resistor) for outputting an operating signal. The operating signal varies according to the manipulative variable of the trigger switch 70 (i.e., how deep the trigger switch 70 is pulled).

The input/output interface 7 determines the target value $\omega_1^*$ in response to the operating signal supplied from the trigger switch 70 and provides the target value $\omega_1^*$ to the controller 3. The controller 3 starts or stop running the motor 1, and controls the velocity of the motor 1, in accordance with the target value $\omega_1^*$ supplied from the input/output interface 7.

The operating panel 71 has the function of setting the operation mode of the electric tool system 100. The operation modes of the electric tool system 100 include at least the electronic clutch mode (torque management mode). The electronic clutch mode is a mode in which the output torque of the output shaft 5 (i.e., the output torque provided by the tip tool 28) is monitored and the operation of the motor 1 is controlled to prevent the output torque from exceeding the upper limit value TqL that has been set. The electric tool system 100 according to this embodiment has the electronic clutch mode as its only operation mode.

The operating panel 71 also has the function of setting the upper limit value TqL. The operating panel 71 includes, for example, two operating buttons (namely, an up button and a down button) for use to set the upper limit value TqL and a display device. The upper limit value TqL may be selected from a plurality of candidate upper limit values. The display device displays a currently selected upper limit value TqL thereon. For example, when the up button is pressed, the upper limit value TqL displayed on the display device increases its value. When the down button is pressed, the upper limit value TqL displayed on the display device decreases its value. The operating panel 71 outputs, as the upper limit value TqL, the value displayed on the display device to the controller 3.

That is to say, the electric tool system 100 includes an upper limit value setting unit (operating panel 71) for setting one of the plurality of candidate upper limit values as the upper limit value TqL.

The motor rotation measuring device 25 measures the rotational angle of the motor 1. As the motor rotation measuring device 25, either a photoelectric encoder or a magnetic encoder may be adopted, for example. Based on the rotational angle of the motor 1 as measured by the motor rotation measuring device 25 and its variation, the rotor position θ and the velocity ω of the (rotor 23 of the) motor 1 may be obtained.

The controller 3 determines the command value $\omega_2$* of the velocity of the motor 1. In particular, the controller 3 determines the command value $\omega_2$* of the velocity of the motor 1 based on a target value $\omega_1$* of the velocity of the motor 1 that has been provided by the trigger switch 70. In addition, the controller 3 also determines the target values (voltage command values) $v_u$*, $v_v$*, and $v_w$* of the drive voltage Va such that the velocity of the motor 1 agrees with the command value $\omega_2$* and gives the target values to the inverter circuit section 2.

(2.2) Controller

Next, the controller 3 will be described in further detail. In this embodiment, the controller 3 controls the motor 1 by vector control. The vector control is a type of motor control method in which a motor current is broken down into a current component that generates torque (rotational power) and a current component that generates a magnetic flux and in which these current components are controlled independently of each other.

Figure 3:
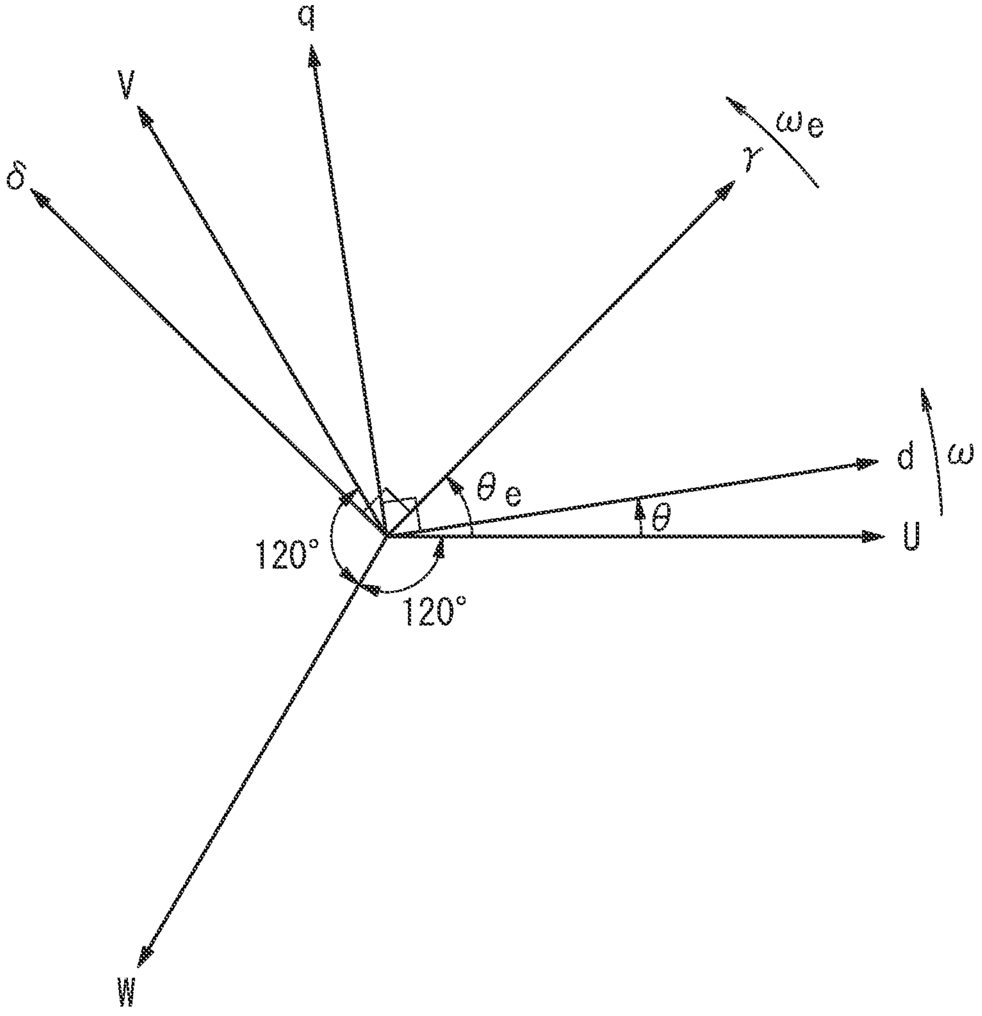
FIG. 3 illustrates how a controller of the electric tool system performs control.

FIG. 3 shows an analysis model of the motor 1 according to the vector control. In FIG. 3, shown are armature winding fixed axes for the U-, V-, and W-phases. According to the vector control, a rotational coordinate system, rotating at as high a rotational velocity as the rotational velocity of a magnetic flux generated by the permanent magnet 231 provided for the rotor 23 of the motor 1, is taken into account. In the rotational coordinate system, the direction of the magnetic flux generated by the permanent magnet 231 is defined by a d-axis and a rotational axis corresponding in control to the d-axis is defined by a γ-axis. A q-axis is set at a phase leading by an electrical angle of 90 degrees with respect to the d-axis. A δ-axis is set at a phase leading by an electrical angle of 90 degrees with respect to the γ-axis. The rotational coordinate system corresponding to real axes is a coordinate system, for which the d-axis and q-axis are selected as its coordinate axes (which will be hereinafter referred to as "dq axes"). The rotational coordinate system in control is a coordinate system, for which the γ-axis and δ-axis are selected as its coordinate axes (which will be hereinafter referred to as "γδ axes").

The dq axes have rotated and their rotational velocity is designated by ω. The γδ axes have also rotated and their rotational velocity is designated by ωe. Also, in the dq axes, the d-axis angle (phase) as viewed from the U-phase armature winding fixed axis is designated by θ. In the same way, in the γδ axes, the γ-axis angle (phase) as viewed from the U-phase armature winding fixed axis is designated by θe. The angles designated by θ and θe are angles as electrical angles and are generally called "rotor positions" or "magnetic pole positions." The rotational velocities designated by ω and ωe are angular velocities represented by electrical angles. In the following description, θ or θe will be hereinafter sometimes referred to as a "rotor position" and ω or ωe will be hereinafter simply referred to as a "velocity."

Basically, the controller 3 performs the vector control such that θ and θe agree with each other. If θ and θe agree with each other, the d-axis and the q-axis agree with the γ-axis and the δ-axis, respectively. In the following description, the γ-axis component and δ-axis component of the drive voltage Va will be represented as needed by a γ-axis voltage $v_\gamma$ and a δ-axis voltage $v_\delta$, respectively, and the γ-axis component and δ-axis component of the drive current will be represented as needed by a γ-axis current $i_\gamma$ and a δ-axis current $i_\delta$, respectively.

Also, voltage command values representing the respective target values of the γ-axis voltage $v_\gamma$ and the δ-axis voltage $v_\delta$ will be represented by a γ-axis voltage command value $v_\gamma$* and a δ-axis voltage command value $v_\delta$*, respectively. Furthermore, current command values representing the respective target values of the γ-axis current $i_\gamma$ and the δ-axis current $i_\delta$ will be represented by a γ-axis current command value $i_\gamma$* and a δ-axis current command value $i_\delta$*, respectively.

The controller 3 performs the vector control to make the values of the γ-axis voltage $v_\gamma$ and δ-axis voltage $v_\delta$ follow the γ-axis voltage command value $v_\gamma$* and the δ-axis voltage command value $v_\delta$*, respectively, and to make the values of the γ-axis current $i_\gamma$ and δ-axis current $i_\delta$ follow the γ-axis current command value $i_\gamma$* and the δ-axis current command value $i_\delta$*, respectively.

The controller 3 includes a computer system including one or more processors and a memory. At least some of the functions of the controller 3 are performed by making the processor of the computer system execute a program stored in the memory of the computer system. The program may be stored in advance in the memory. Alternatively, the program may also be downloaded via a telecommunications line such as the Internet or distributed after having been stored in a non-transitory storage medium such as a memory card.

As shown in FIG. 2, the controller 3 includes a coordinate transformer 12, a subtractor 13, another subtractor 14, a current controller 15, a flux controller 16, a velocity controller 17, another coordinate transformer 18, still another subtractor 19, a position and velocity estimator 20, a step-out detector 21, and a setter 22. Note that the coordinate transformer 12, the subtractors 13, 14, 19, the current controller 15, the flux controller 16, the velocity controller 17, the coordinate transformer 18, the position and velocity estimator 20, the step-out detector 21, and the setter 22 represent respective functions to be performed by the controller 3. Thus, the respective constituent elements of the controller 3 may freely use the respective values generated inside the controller 3.

The setter 22 generates a command value $\omega_2$* of the velocity of the motor 1. The setter 22 determines the command value $\omega_2$* based on the target value $\omega_1$* provided by the input/output interface 7 and other values. The setter 22 will be described in detail later in the "(2.3) Command value" section.

The coordinate transformer 12 performs, based on the rotor position $\theta_e$, coordinate transformation on the U-phase current $i_u$ and the V-phase current $i_v$ on the γδ axes, thereby calculating and outputting a γ-axis current $i_\gamma$ and a δ-axis current $i_\delta$. As used herein, the γ-axis current $i_\gamma$ is a type of excitation current corresponding to the d-axis current and hardly contributing to torque. On the other hand, the δ-axis current $i_\delta$ is a current corresponding to the q-axis current and significantly contributing to torque. The rotor position $\theta_e$ is calculated by the position and velocity estimator 20.

The subtractor 19 refers to the velocity we and the command value $\omega_2$* and calculates a velocity deviation ($\omega_2$*−ωe) between the velocity we and the command value $\omega_2$*. The velocity we is calculated by the position and velocity estimator 20.

The velocity controller 17 calculates a δ-axis current command value $i_\delta$* by proportional integral control, for example, such that the velocity deviation ($\omega_2$*−ωe) converges toward zero and outputs the δ-axis current command value $i_\delta$* thus calculated.

The flux controller 16 determines a γ-axis current command value $i_\gamma$* and outputs the γ-axis current command value $i_\gamma$* to the subtractor 13. The γ-axis current command value $i_\gamma$* may have any of various values according to the type of the vector control performed by the controller 3 and the velocity ω of the motor 1, for example. If the maximum torque control is performed with the d-axis current set at zero, for example, then the γ-axis current command value $i_\gamma$* is set at zero. On the other hand, if a flux weakening control is performed with a d-axis current allowed to flow, then the γ-axis current command value $i_\gamma$* is set at a negative value corresponding to the velocity we. In the following description, a situation where the γ-axis current command value $i_\gamma$* is zero will be described.

The subtractor 13 subtracts the γ-axis current $i_\gamma$ provided by the coordinate transformer 12 from the γ-axis current command value $i_\gamma$* provided by the flux controller 16, thereby calculating a current error ($i_\gamma$*−$i_\gamma$). The subtractor 14 subtracts the δ-axis current $i_\delta$ provided by the coordinate transformer 12 from the value $i_\delta$* provided by the velocity controller 17, thereby calculating a current error ($i_\delta$*−$i_\delta$).

The current controller 15 performs current feedback control by proportional integral control, for example, such that both the current errors ($i_\gamma$*−$i_\gamma$) and ($i_\delta$*−$i_\delta$) converge toward zero. In this case, the current controller 15 calculates a γ-axis voltage command value $v_\gamma$* and a δ-axis voltage command value $v_\delta$* by using non-interference control to eliminate interference between the γ-axis and the δ-axis such that both ($i_\gamma$*−$i_\gamma$) and ($i_\delta$*−$i_\delta$) converge toward zero.

The coordinate transformer 18 performs, based on the rotor position θe provided by the position and velocity estimator 20, coordinate transformation on the γ-axis voltage command value $v_\gamma$* and the δ-axis voltage command value $v_\delta$* provided by the current controller 15 on three-phase fixed coordinate axes, thereby calculating and outputting voltage command values ($v_u$*, $v_v$*, and $v_w$*).

The inverter circuit section 2 supplies, to the motor 1, three-phase voltages corresponding to the voltage command values ($v_u$*, $v_v$*, and $v_w$*) provided by the coordinate transformer 18. In response, the motor 1 is driven with the power (three-phase voltages) supplied from the inverter circuit section 2 and generates rotational power.

The position and velocity estimator 20 estimates the rotor position θe and the velocity ωe. More specifically, the position and velocity estimator 20 may perform, for example, proportional integral control using some or all of $i_\gamma$ and $i_\delta$ provided by the coordinate transformer 12 and $v_\gamma$* and $v_\delta$* provided by the current controller 15. The position and velocity estimator 20 estimates the rotor position θe and the velocity we such that the axial error (θe−θ) between the d-axis and the γ-axis converges toward zero. Note that various methods for estimating the rotor position θe and the velocity ωe have been proposed in the art. The position and velocity estimator 20 may adopt any of those various known methods.

The step-out detector 21 determines whether or not a step-out (out of synchronism) has occurred in the motor 1. More specifically, the step-out detector 21 determines, based on the magnetic flux of the motor 1, whether or not a step-out has occurred in the motor 1. The magnetic flux of the motor 1 may be obtained based on the d-axis current, the q-axis current, the γ-axis voltage command value $v_\gamma$*, and the δ-axis voltage command value $v_\delta$*. When finding the amplitude of the magnetic flux of the motor 1 less than a threshold value, the step-out detector 21 may decide that a step-out have occurred in the motor 1. Note that the threshold value may be determined appropriately based on the amplitude of the magnetic flux generated by the permanent magnet 231 of the motor 1. Various known methods for detecting the step-out have been proposed in the art. The step-out detector 21 may adopt any of those various known methods.

(2.3) Command Value

As described above, the controller 3 controls the operation of the motor 1 such that the velocity we of the motor 1 agrees with the command value $\omega_2$* of the velocity of the motor 1 that has been generated by the setter 22. Next, it will be described how the setter 22 performs the operation of generating the command value $\omega_2$*.

The setter 22 determines the command value $\omega_2$* based on the target value $\omega_1$* and the upper limit value TqL that have been provided by the input/output interface 7, the velocity ωe of the motor 1, and the torque value Tq1 acquired by the acquirer 31.

Figure 4:
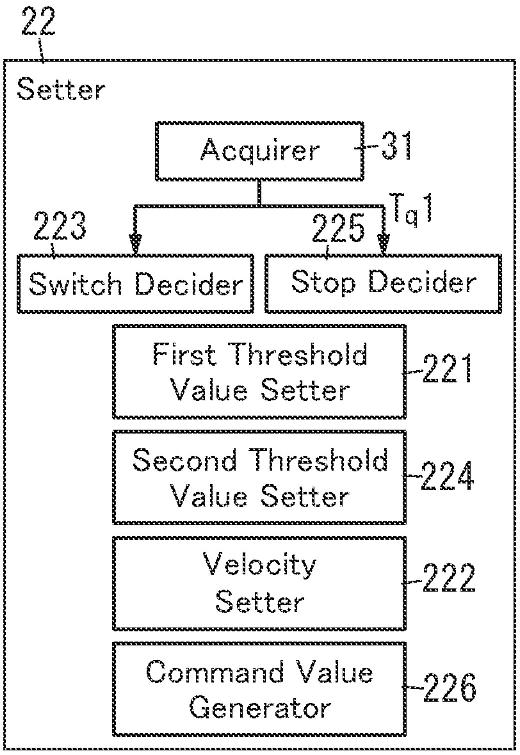
FIG. 4 is a block diagram of a setter included in the controller of the electric tool system.

In this embodiment, the acquirer 31 is included in the setter 22 in this embodiment as shown in FIG. 4. The acquirer 31 acquires the value of the δ-axis current $i_\delta$ from the coordinate transformer 12. As described above, the δ-axis current $i_\delta$ corresponds to the q-axis current and is a current component contributing significantly to a torque. The acquirer 31 acquires, based on the δ-axis current $i_\delta$, a torque value Tq1 related to the output torque provided by the tip tool 28. In the following description, the δ-axis current $i_\delta$ will be hereinafter referred to as a "torque current" for convenience sake. In short, the acquirer 31 acquires the torque value Tq1 based on the torque current (δ-axis current $i_\delta$) flowing through the motor 1.

In this case, the acquirer 31 corrects the δ-axis current $i_\delta$ based on the acceleration of the motor 1 and acquires the torque value Tq1 based on the value thus obtained (i.e., the δ-axis current that has been corrected). That is to say, if the velocity of the motor 1 changes (i.e., if the motor 1 either accelerates or decelerates), then the δ-axis current $i_\delta$ includes not only a current component to generate the output torque of the output shaft 5 but also a current component to change the velocity of the motor 1 as well. Thus, the acquirer 31 obtains the current component to generate the output torque of the output shaft 5 by correcting the δ-axis current $i_\delta$ according to the acceleration of the motor 1 and acquires the torque value Tq1 based on the current component thus obtained.

The present inventors carried out extensive research to discover that the current component of the δ-axis current $i_\delta$ that changes the velocity of the motor 1 has a linear relation with the acceleration (i.e., variation in the number of revolutions) of the motor 1. The present inventors discovered that in one experimental example, the equation $Y=0.095x+2.5$, where Y [A] is the current component of the δ-axis current $i_\delta$ that changes the velocity of the motor 1 and x [rpm/s] is the acceleration of the motor 1 (variation in number of revolutions), is satisfied. Thus, the current component of the δ-axis current $i_\delta$ that generates the output torque of the output shaft 5 (i.e., the δ-axis current that has been corrected) may be obtained by subtracting the Y value as a correction value from the value of the δ-axis current $i_\delta$. In the following description, the δ-axis current that has been corrected will be hereinafter referred to as a "corrected torque current" for convenience sake.

The setter 22 has a normal operation mode and a constant velocity operation mode.

When the electric tool system 100 starts operating, the setter 22 operates in the normal operation mode. In the normal operation mode, the setter 22 sets the target value $\omega_1$* provided by the input/output interface 7 as the command value $\omega_2$*. In the normal operation mode, the command value $\omega_2$* agrees with the target value $\omega_1$*.

When the predetermined condition is satisfied while the setter 22 is operating in the normal operation mode, the operation mode of the setter 22 switches from the normal operation mode to the constant velocity operation mode.

In the constant velocity operation mode, the setter 22 sets a "restriction value ωc" as the command value $\omega_2$*. The restriction value ωc is a value to be determined according to the upper limit value TqL that has been set by the upper limit value setting unit (operating panel 71). In the constant velocity operation mode, the command value $\omega_2$* agrees with the restriction value ωc.

Furthermore, in both the normal operation mode and the constant velocity operation mode, when the torque value Tq1 acquired by the acquirer 31 reaches the upper limit value TqL, the setter 22 sets the command value $\omega_2$* at zero to make the motor 1 stop running (i.e., performs the electronic clutch control).

More specifically, the setter 22 includes not only the acquirer 31 but also a first threshold value setter 221, a velocity setter 222, a switch decider 223, a second threshold value setter 224, a stop decider 225, and a command value generator 226 as shown in FIG. 4.

The first threshold value setter 221 sets a first threshold value Th1 (see FIG. 7) according to the upper limit value TqL that has been set by the upper limit value setting unit. The first threshold value Th1 is a value to be compared by the switch decider 223 with the corrected torque current (i.e., the δ-axis current that has been corrected) while the setter 22 is operating in the normal operation mode. A plurality of candidate first threshold values corresponding one to one to the plurality of candidate upper limit values have been registered in advance. A candidate first threshold value corresponding to the upper limit value TqL that has been set by the upper limit value setting unit is selected as the first threshold value Th1. If the corrected torque current reaches the first threshold value Th1, it means that the output torque has reached a threshold value. In short, the threshold value is a value depending on the upper limit value set by the upper limit value setting unit.

The velocity setter 222 sets a restriction value ωc according to the upper limit value TqL that has been set by the upper limit value setting unit. The restriction value ωc is a value set by the setter 22 as the command value $\omega_2$* while the setter 22 is operating in the constant velocity operation mode. In addition, the restriction value ωc is also a value to be compared by the switch decider 223 with the velocity we of the motor 1 while the setter 22 is operating in the normal operation mode. A plurality of candidate restriction values corresponding one to one to the plurality of candidate upper limit values have been registered in advance. A candidate restriction value corresponding to the upper limit value TqL that has been set by the upper limit value setting unit is selected as the restriction value ωc. In short, the restriction value ωc is a value depending on the upper limit value set by the upper limit value setting unit.

The switch decider 223 decides whether to switch the operation mode of the setter 22 from the normal operation mode to the constant velocity operation mode. When finding a predetermined condition satisfied, the switch decider 223 switches the operation mode of the setter 22 from the normal operation mode to the constant velocity operation mode. In this case, the predetermined condition includes a first condition and a second condition.

The first condition is a condition that the torque value Tq1 acquired by the acquirer 31 reach a threshold value. In particular, the first condition is a condition that the torque value Tq1 increase from a value smaller than a threshold value to reach the threshold value.

In this case, the switch decider 223 compares the corrected torque current (i.e., the δ-axis current that has been corrected) with the first threshold value Th1. When finding that the corrected torque current has reached the first threshold value Th1, the switch decider 223 decides that the torque value Tq1 have reached the threshold value. That is to say, the output torque of the motor 1 depends on the corrected torque current flowing through the motor 1. Thus, the switch decider 223 is configured to, when finding that the corrected torque current has reached the first threshold value Th1, decide that the torque value Tq1 have reached the threshold value.

The switch decider 223 compares, in the normal operation mode, the corrected torque current with the first threshold value Th1 as needed to determine whether the corrected torque current has reached the first threshold value Th1.

The second condition is a condition that the velocity ωe (or velocity ω) of the motor 1 be equal to or greater than the restriction value ωc that has been set by the velocity setter 222. The switch decider 223 compares, in the normal operation mode, the velocity we of the motor 1 with the restriction value ωc to determine whether the velocity we is equal to or greater than the restriction value ωc.

In short, the predetermined condition includes a condition that the torque value Tq1 acquired by the acquirer 31 reach a threshold value smaller than the upper limit value TqL (as the first condition). The predetermined condition further includes a condition that the velocity we of the motor 1 be equal to or greater than the restriction value ωc (as the second condition).

When finding the first condition and the second condition both satisfied, the switch decider 223 decides that the predetermined condition have been satisfied and switches the operation mode of the setter 22 from the normal operation mode to the constant velocity operation mode.

The second threshold value setter 224 sets a second threshold value Th2 (see FIG. 7) based on the upper limit value TqL that has been set by the upper limit value setting unit and the velocity ωe (or velocity ω) of the motor 1. The second threshold value Th2 is a value to be compared by the stop decider 225 with the corrected torque current (i.e., the δ-axis current that has been corrected) while the setter 22 is operating in each of the normal operation mode and the constant velocity operation mode. The second threshold value Th2 is larger than the first threshold value Th1.

The second threshold value setter 224 sets the second threshold value Th2 such that as the velocity ωe of the motor 1 increases, the second threshold value Th2 decreases, with respect to a certain upper limit value TqL set by the upper limit value setting unit. In addition, the second threshold value setter 224 also sets the second threshold value Th2 such that as the upper limit value TqL increases, the second threshold value Th2 increases, with respect to a certain velocity ωe of the motor 1.

As described above, in the constant velocity operation mode, the velocity we of the motor 1 is controlled toward the restriction value ωc, and therefore, the second threshold value Th2 is also controlled toward a value corresponding to the upper limit value TqL that has been set. That is to say, in the constant velocity operation mode, the second threshold value Th2 remains constant unless the upper limit value TqL is changed.

In the normal operation mode, on the other hand, the velocity we of the motor 1 varies with time according to the target value $\omega_1$* provided by the input/output interface 7. Thus, in the normal operation mode, the second threshold value Th2 is variable with time.

The stop decider 225 determines whether or not the stop condition is satisfied in the normal operation mode and the constant velocity operation mode. The stop condition includes a condition that the corrected torque current (i.e., the δ-axis current that has been corrected) have reached the second threshold value Th2.

The stop decider 225 compares the corrected torque current with the second threshold value Th2 as needed. When finding that the corrected torque current has reached the second threshold value Th2, the stop decider 225 decides that the torque value Tq1 have reached the upper limit value TqL and gives a command to stop the motor 1 to the command value generator 226.

The command value generator 226 generates the command value $\omega_2$*. The command value generator 226 sets, in the normal operation mode, the target value $\omega_1$* provided by the input/output interface 7 as the command value $\omega_2$*. In the constant velocity operation mode, on the other hand, the command value generator 226 sets the restriction value ωc that has been generated by the velocity setter 222 as the command value $\omega_2$*.

Furthermore, on receiving a command to stop the motor 1 from the stop decider 225, the command value generator 226 sets the command value $\omega_2$* at zero. That is to say, when finding that the torque value Tq1 has reached the upper limit value TqL, the controller 3 makes the motor 1 stop running.

Figure 6:
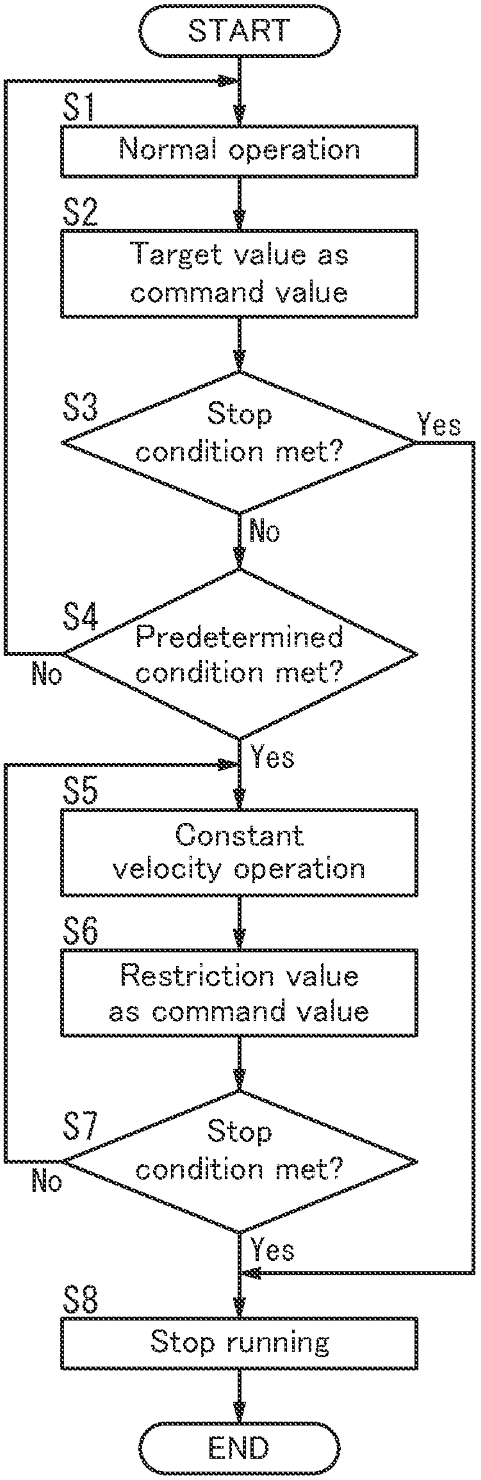
FIG. 6 is a flowchart showing how the controller of the electric tool system operates.

Next, it will be described briefly with reference to the flowchart shown in FIG. 6 how the setter 22 operates.

When the trigger switch 70 is turned ON, the setter 22 starts operating in the normal operation mode (in S1), acquires the upper limit value TqL from the input/output interface 7, and generates and sets, based on the upper limit value TqL thus acquired, a first threshold value Th1, a second threshold value Th2, and a restriction value ωc. Then, the setter 22 outputs, as the command value $\omega_2$*, a target value $\omega_1$* depending on the depth to which the trigger switch 70 has been pulled (in S2) to make the motor 1 start running. After the motor 1 has started running, the setter 22 acquires the velocity ωe of the motor 1 and the torque current (δ-axis current $i_\delta$) as needed.

In the normal operation mode, the setter 22 determines, as needed, whether or not the stop condition is satisfied (in S3). If the stop condition is satisfied (if the answer is YES in S3), then the setter 22 outputs 0 [rpm] as the command value $\omega_2$* and makes the motor 1 stop running (in S8). On the other hand, unless the stop condition is satisfied (if the answer is NO in S3), the setter 22 determines whether or not the predetermined condition (including the first condition and the second condition) is satisfied (in S4). Unless the predetermined condition is satisfied (if the answer is NO in S4), the setter 22 continues to operate in the normal operation mode.

On the other hand, if the predetermined condition is satisfied (if the answer is YES in S4), the setter 22 starts operating in the constant velocity operation mode (in S5). If the upper limit value TqL has been changed by the upper limit value setting unit, the setter 22 acquires the upper limit value TqL from the input/output interface 7 and sets the first threshold value Th1, the second threshold value Th2, and the restriction value ωc. Then, the setter 22 outputs the restriction value ωc as the command value $\omega_2$* (in S6). The setter 22 makes the motor 1 run such that the velocity of the motor 1 becomes equal to the restriction value ωc and then acquires the velocity we of the motor 1 and the torque current (δ-axis current $i_\delta$) as needed.

When operating in the constant velocity operation mode, the setter 22 determines, as needed, whether or not the stop condition is satisfied (in S7). Unless the stop condition is satisfied (if the answer is NO in S7), the setter 22 continues to operate in the constant velocity operation mode. On the other hand, if the stop condition is satisfied (if the answer is YES in S7), the setter 22 outputs 0 [rpm] as the command value $\omega_2$* to make the motor 1 stop running (in S8).

(2.4) Exemplary Operation

Next, an exemplary operation of the electric tool system 100 will be described with reference to FIG. 7.

Figure 7:
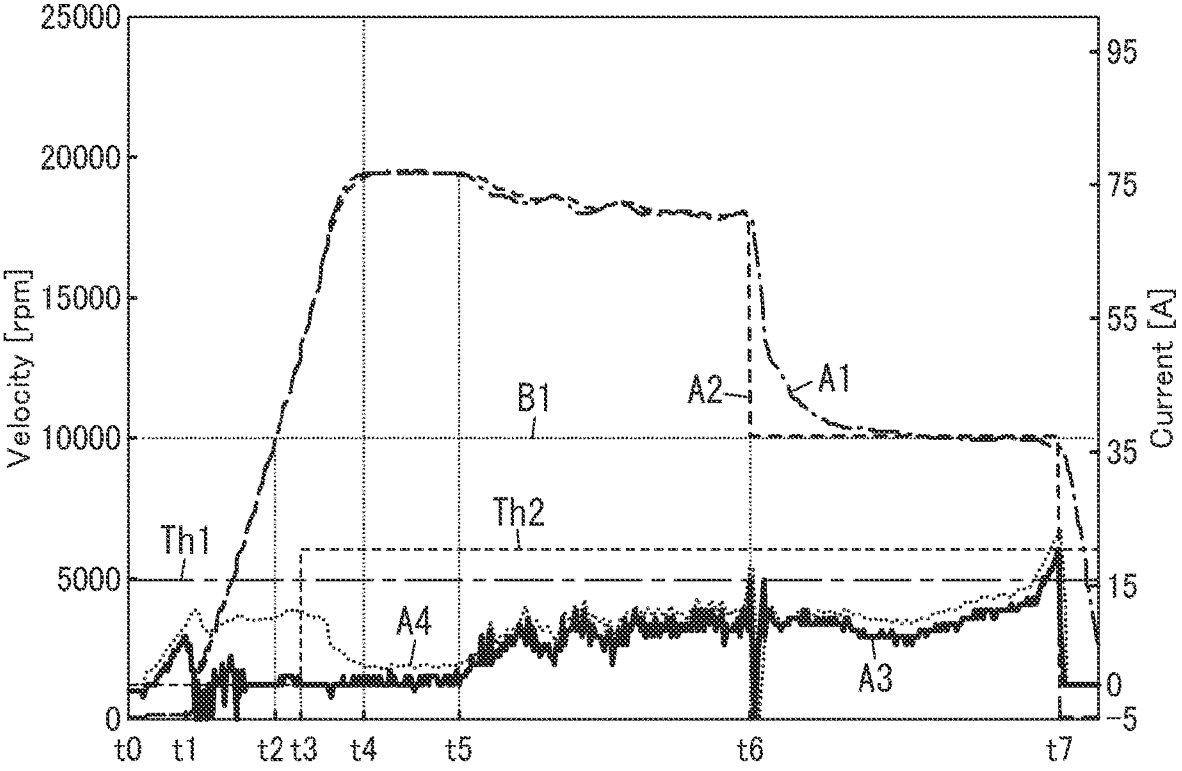
FIG. 7 is a graph showing an exemplary operation of the electric tool system.

In FIG. 7, "A1" indicates the velocity ω [rpm] of the motor 1, "A2" indicates the command value $\omega_2$* [rpm], and "A3" indicates the corrected torque current [A]. Note that "A4" indicates the torque current (δ-axis current $i_\delta$) [A] that has not been corrected by the acquirer 31 yet.

Also, in FIG. 7, "B1" indicates the restriction value ωc [rpm] of the velocity of the motor 1, "Th1" indicates the first threshold value Th1 [A], and "Th2" indicates the second threshold value Th2 [A]. In the example shown in FIG. 7, the restriction value ωc of the velocity of the motor 1 is set at 10000 [rpm] and the first threshold value Th1 is set at 15 [A]. Also, the second threshold value Th2 is set at 20 A from a point in time t3 on. Note that the period from the point in time t0 through the point in time t3 is a mask period in which the stop decider 225 does not operate. That is to say, even if the corrected torque current exceeds the second threshold value Th2 during the mask period, the controller 3 does not make the motor 1 stop running. This may reduce the chances that the motor 1 cannot start running. In FIG. 7, it is indicated by the second threshold value Th2 of 0 [A] that the stop decider 225 does not operate (during the period from the point in time t0 through the point in time t3).

When the user performs the operation of pulling the trigger switch 7 with the tip tool 28 put on the head of a fastening member (e.g., a wood screw), the setter 22 starts operating in the normal operation mode and the motor 1 starts running (at the point in time t0). Thus, a current starts to be supplied to the motor 1 and the torque current increases. Thereafter, the command value $\omega_2$* continues to increase from no later than around the point in time t1 through around a point in time t4. As a result, the velocity ω of the motor 1 also continues to increase. Note that the period from the point in time t1 through the point in time t4 is a period during which the wood screw is going to be screwed into a pilot hole. Thus, during that period, the torque current includes, as its major component, a current component that causes the velocity of the motor 1 to change (i.e., that accelerates the motor 1), and the corrected torque current is approximately equal to 0 [A].

While operating in the normal operation mode, the setter 22 determines, as needed (on a steady basis), whether the predetermined condition (including the first condition and the second condition) is satisfied or not. In this example, the velocity ω of the motor 1 reaches the restriction value ωc at the point in time t2, and therefore, the second condition is satisfied from the point in time t2 on.

At a point in time t5, the wood screw reaches the bottom of the pilot hole. From this point in time on, the torque current and the corrected torque current increase and the velocity of the motor 1 decreases.

When finding that the corrected torque current has reached the first threshold value Th1 (at a point in time t6), the controller 3 (the setter 22) decides that the first condition (and the second condition) have been satisfied and switches the operation mode into the constant velocity operation mode. This allows the command value $\omega_2$* to be controlled toward the restriction value ωc compulsorily. In this case, the controller 3 (setter 22) changes the velocity (command value $\omega_2$*) of the motor 1 into the restriction value ωc in a single stage.

Thereafter, when finding that the corrected torque current has reached the second threshold value Th2 (at a point in time t7), the setter 22 sets the command value $\omega_2$* at 0 [rpm] and makes the motor 1 stop running.

Note that in the work of tightening a screw, if the corrected torque current has reached the second threshold value Th2 (at the point in time t7), this may mean that the head of the screw has been seated on a work target.

As can be seen from the foregoing description, in the electric tool system 100 according to this embodiment, when finding the predetermined condition satisfied in the electronic clutch mode (at the point in time t6), the controller 3 controls the motor 1 such that the velocity of the motor 1 becomes equal to the predetermined restriction value ωc (10000 [rpm]) irrespective of the manipulative variable of the trigger switch 70. This enables avoiding a situation where the electronic clutch control cannot be performed. In addition, this may also reduce the dispersion in the velocity of the motor 1 just before the motor 1 is stopped. This enables reducing the dispersion in the fastening torque output from the tip tool 28 to the work target, thus improving the user-friendliness of the electric tool system 100.

(3) VARIATIONS

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Next, variations of the exemplary embodiment will be enumerated one after another.

The functions performed by the controller 3 of the electric tool system 100 may also be implemented as a method for controlling the electric tool system 100, a (computer) program, or a non-transitory storage medium that stores the program thereon.

A control method according to an aspect is a control method for controlling an electric tool system 100. The electric tool system 100 includes a motor 1, an output shaft 5, a transmission mechanism 4, an acquirer 31, and a trigger switch 70. The output shaft 5 is to be coupled to a tip tool 28. The transmission mechanism 4 transmits motive power of the motor 1 to the output shaft 5. The acquirer 31 acquires, based on a current flowing through the motor 1, a torque value Tq1 related to output torque provided by the tip tool 28. The trigger switch 70 accepts an operating command entered by a user. The control method includes controlling the motor 1 in a torque management mode in which the motor 1 is controlled in accordance with the operating command entered through the trigger switch 70 and the torque value Tq1 acquired by the acquirer 31 is prevented from exceeding an upper limit value TqL. The control method further includes controlling, when finding a predetermined condition satisfied in the torque management mode, the motor 1 to turn a velocity of the motor 1 into a predetermined restriction value ωc irrespective of a manipulative variable of the trigger switch 70. The predetermined condition includes a condition that the torque value Tq1 acquired by the acquirer 31 reach a threshold value smaller than the upper limit value TqL.

A program according to another aspect is designed to cause one or more processors to perform the method for controlling the electric tool system 100 described above. The program may be distributed after having been stored in a non-transitory storage medium.

The agent that performs the function of the controller 3 described above includes a computer system. The computer system includes a processor and a memory as principal hardware components. Some of the functions of the controller 3 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, all of which are readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be used as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the controller 3 are aggregated together in a single housing. However, this is not an essential configuration. Alternatively, those constituent elements of the controller 3 may be distributed in multiple different housings. Still alternatively, the plurality of functions of the controller 3 may be aggregated together in a single housing as in the basic example described above. Furthermore, at least some functions of the controller 3 may be implemented as a cloud computing system as well.

In one variation, when finding the predetermined condition satisfied, the controller 3 (setter 22) may change the velocity (command value $\omega_2$*) of the motor 1 into the restriction value ωc stepwise in multiple stages. When finding the predetermined condition satisfied, the controller 3 (setter 22) may change the velocity (command value $\omega_2$*) of the motor 1 into the restriction value ωc either linearly or in an S-curve, convex down, or convex up shape with the passage of time.

In another variation, the predetermined condition consists of only the first condition. In that case, if the first condition is satisfied while the motor 1 is rotating at low velocities with the second condition not satisfied (i.e., while the velocity of the motor 1 is smaller than the restriction value ωc), then the velocity (command value $\omega_2$*) of the motor 1 is increased to the restriction value ωc.

In still another variation, the controller 3 (setter 22) may decide, even when only one of a first condition or a second condition is satisfied and then only the other of the first and second conditions is satisfied, that the predetermined condition fail to be satisfied. For example, when finding the first condition satisfied, the controller 3 sets up a first flag. When finding the second condition satisfied, the controller 3 sets up a second flag. Then, when finding that the first flag and the second flag have both been set up, the controller 3 decides that the predetermined condition have been satisfied. For example, when finding that only the first flag has been set up because only the first condition is satisfied at a point in time with the second condition not satisfied, the controller 3 will reset the first flag after that. When finding only the second condition satisfied at a subsequent point in time with the first condition not satisfied, the controller 3 decides that only the second flag have been set up and the predetermined condition fail to be satisfied.

Conversely, the controller 3 (setter 22) may decide, when only one of the first condition or the second condition is satisfied and then only the other of the first and second conditions is satisfied, that the predetermined condition have been satisfied. In that case, when finding that only the first flag has been set up because only the first condition is satisfied at a point in time with the second condition not satisfied, the controller 3 does not reset the first flag.

In yet another variation, the operation mode of the electric tool system 100 may include at least one more mode other than the electronic clutch mode. Examples of the other modes may include a basic mode, for example. In the basic mode, the electric tool system 100 always causes the motor 1 to rotate at a velocity that varies depending on the depth to which the trigger switch 70 has been pulled, irrespective of the magnitude of the output torque provided by the output shaft 5. The operation mode of the electric tool system 100 may be changed by, for example, operating a selector switch provided for the operating panel 71.

In yet another variation, the first threshold value Th1 may be proportional to the second threshold value Th2. For example, the first threshold value Th1 may be a value that is 0.5 to 0.7 times as large as the second threshold value Th2.

In yet another variation, the setter 22 does not have to obtain the corrected torque current. That is to say, the setter 22 (including the switch decider 223 and the stop decider 225) may compare the torque current, not the corrected torque current, with the first threshold value Th1 and the second threshold value Th2.

In yet another variation, the setter 22 (switch decider 223) may compare, in the normal operation mode, the command value $\omega_2$* of the velocity of the motor 1, not the velocity of the motor 1, with the restriction value ωc.

In yet another variation, it may be determined, based on decisions that have been made multiple times (e.g., five times), whether a certain threshold value (which may be the first threshold value Th1, the second threshold value Th2, or the restriction value ωc) has been reached or whether the value in question is equal to or greater than the certain threshold value. This may reduce the effect of the noise.

In yet another variation, when finding the target value $\omega_1$* less than the restriction value cc while operating in the constant velocity operation mode, the setter 22 may switch its operation mode into the normal operation mode.

(4) ASPECTS

The embodiment and its variations described above and their equivalents may be specific implementations of the following aspects of the present disclosure.

An electric tool system (100) according to a first aspect includes a motor (1), an output shaft (5), a transmission mechanism (4), an acquirer (31), a trigger switch (70), and a controller (3). The output shaft (5) is to be coupled to a tip tool (28). The transmission mechanism (4) transmits motive power of the motor (1) to the output shaft (5). The acquirer (31) acquires, based on a current flowing through the motor (1), a torque value (Tq1) related to output torque provided by the tip tool (28). The trigger switch (70) accepts an operating command entered by a user. The controller (3) has a torque management mode in which the controller (3) controls the motor (1) in accordance with the operating command entered through the trigger switch (70) and prevents the torque value (Tq1) acquired by the acquirer (31) from exceeding an upper limit value (TqL). The controller (3) controls, when finding a predetermined condition satisfied in the torque management mode, the motor (1) to turn a velocity of the motor (1) into a predetermined restriction value (ωc) irrespective of a manipulative variable of the trigger switch (70). The predetermined condition includes a condition that the torque value (Tq1) acquired by the acquirer (31) reach a threshold value smaller than the upper limit value (TqL).

According to this aspect, before the motor (1) stops in response to the torque value (Tq1) reaching an upper limit value (TqL), the velocity of the motor (1) is controlled into a restriction value (ωc) in response to the torque value (Tq1) reaching a threshold value. That is to say, it is not until the velocity of the motor 1 has once approached the restriction value (ωc) that the motor (1) is stopped. This enables reducing a dispersion in the velocity (ωe) of the motor (1) just before the motor (1) is stopped, thus improving the user-friendliness.

An electric tool system (100) according to a second aspect, which may be implemented in conjunction with the first aspect, further includes an upper limit value setting unit (operating panel 71). The upper limit value setting unit sets one of a plurality of candidate upper limit values as the upper limit value (TqL).

This aspect allows the user to choose his or her desired upper limit value (TqL).

In an electric tool system (100) according to a third aspect, which may be implemented in conjunction with the second aspect, the restriction value (ωc) is a value depending on the upper limit value (TqL) set by the upper limit value setting unit.

This aspect enables setting a restriction value (ωc) depending on the upper limit value (TqL), thus enabling the motor 1 to run at a velocity (restriction value ωc) suitable to the magnitude of desired fastening torque (upper limit value TqL).

In an electric tool system (100) according to a fourth aspect, which may be implemented in conjunction with the second or third aspect, the threshold value is a value depending on the upper limit value (TqL) set by the upper limit value setting unit.

This aspect enables setting a threshold value depending on the upper limit value (TqL).

In an electric tool system (100) according to a fifth aspect, which may be implemented in conjunction with any one of the first to fourth aspects, the controller (3) controls the motor (1) by vector control. The acquirer (31) acquires the torque value (Tq1) based on a torque current flowing through the motor (1).

This aspect enables acquiring the torque value (Tq1) by using a torque current for use in vector control and eliminates the need to provide an additional dedicated sensor, for example, thus contributing to simplifying the configuration.

In an electric tool system (100) according to a sixth aspect, which may be implemented in conjunction with any one of the first to fifth aspects, the controller (3) controls, in the torque management mode, the velocity of the motor (1) in accordance with the manipulative variable of the trigger switch (70) until the predetermined condition is satisfied.

This aspect enables shortening the work time, thus improving the user-friendliness.

In an electric tool system (100) according to a seventh aspect, which may be implemented in conjunction with any one of the first to sixth aspects, the controller (3) performs, when finding the predetermined condition satisfied, control to change the velocity of the motor (1) stepwise in multiple stages into the restriction value (ωc).

This aspect enables improving the user-friendliness.

In an electric tool system (100) according to an eighth aspect, which may be implemented in conjunction with any one of the first to sixth aspects, the controller (3) performs, when finding the predetermined condition satisfied, control to change the velocity of the motor (1) in a single stage into the restriction value (ωc).

This aspect enables improving the user-friendliness.

In an electric tool system (100) according to a ninth aspect, which may be implemented in conjunction with any one of the first to eighth aspects, the predetermined condition further includes a condition that the velocity of the motor (1) be equal to or greater than the restriction value.

This aspect enables improving the user-friendliness.

In an electric tool system (100) according to a tenth aspect, which may be implemented in conjunction with the ninth aspect, the controller (3) decides, even when only one of a first condition or a second condition is satisfied and then only the other of the first and second conditions is satisfied, that the predetermined condition fail to be satisfied. The first condition is a condition that the torque value (Tq1) reach the threshold value. The second condition is a condition that the velocity of the motor (1) become equal to or greater than the restriction value (ωc).

This aspect enables improving the user-friendliness.

In an electric tool system (100) according to an eleventh aspect, which may be implemented in conjunction with any one of the first to tenth aspects, the controller (3) makes, when the torque value (Tq1) reaches the upper limit value (TqL), the motor (1) stop running.

This aspect enables performing so-called "electronic clutch control."

A control method according to a twelfth aspect is a control method for controlling an electric tool system (100). The electric tool system (100) includes a motor (1), an output shaft (5), a transmission mechanism (4), an acquirer (31), and a trigger switch (70). The output shaft (5) is to be coupled to a tip tool (28). The transmission mechanism (4) transmits motive power of the motor (1) to the output shaft (5). The acquirer (31) acquires, based on a current flowing through the motor (1), a torque value (Tq1) related to output torque provided by the tip tool (28). The trigger switch (70) accepts an operating command entered by a user. The control method includes controlling the motor (1) in a torque management mode in which the motor (1) is controlled in accordance with the operating command entered through the trigger switch (70) and the torque value (Tq1) acquired by the acquirer (31) is prevented from exceeding an upper limit value (TqL). The control method further includes controlling, when finding a predetermined condition satisfied in the torque management mode, the motor (1) to turn a velocity of the motor (1) into a predetermined restriction value (ωc) irrespective of a manipulative variable of the trigger switch (70). The predetermined condition includes a condition that the torque value (Tq1) acquired by the acquirer (31) reach a threshold value smaller than the upper limit value (TqL).

According to this aspect, before the motor (1) stops in response to the torque value (Tq1) reaching an upper limit value (TqL), the velocity of the motor (1) is controlled into a restriction value (ωc) in response to the torque value (Tq1) reaching a threshold value. That is to say, it is not until the velocity of the motor (1) has once approached the restriction value (ωc) that the motor (1) is stopped. This enables reducing a dispersion in the velocity of the motor (1) just before the motor (1) is stopped, thus improving the user-friendliness.

A program according to a thirteenth aspect is designed to cause one or more processors to perform the control method according to the twelfth aspect.

This aspect enables improving the user-friendliness.

REFERENCE SIGNS LIST

1 Motor
3 Controller
4 Transmission Mechanism
5 Output Shaft
28 Tip Tool
31 Acquirer
70 Trigger Switch
100 Electric Tool System
Tq1 Torque Value
TqL Upper Limit Value
ωc Restriction Value
ωe Velocity

The invention claimed is:

1. An electric tool system comprising:

a motor;

an output shaft to be coupled to a tip tool;

a transmission mechanism configured to transmit motive power of the motor to the output shaft;

an acquirer configured to acquire, based on a current flowing through the motor, a torque value related to output torque provided by the tip tool;

a trigger switch configured to accept an operating command entered by a user; and a controller having a torque management mode in which the controller controls the motor in accordance with the operating command entered through the trigger switch and prevents the torque value acquired by the acquirer from exceeding an upper limit value, the controller being configured to, when finding a predetermined condition satisfied in the torque management mode, control the motor to forcibly turn a velocity of the motor into a predetermined restriction value irrespective of a manipulative variable of the trigger switch, the predetermined condition including a condition that the torque value acquired by the acquirer reach a threshold value smaller than the upper limit value, the controller being configured to, when finding that the torque value acquired by the acquirer reaches the upper limit value after the predetermined condition is satisfied in the torque management mode, control the motor to stop running.

2. The electric tool system of claim 1, further comprising an upper limit value setting unit configured to set one of a plurality of candidate upper limit values as the upper limit value.

3. The electric tool system of claim 2, wherein the restriction value is a value depending on the upper limit value set by the upper limit value setting unit.

4. The electric tool system of claim 2, wherein the threshold value is a value depending on the upper limit value set by the upper limit value setting unit.

5. The electric tool system of claim 1, wherein the controller is configured to control the motor by vector control, and the acquirer is configured to acquire the torque value based on a torque current flowing through the motor.

6. The electric tool system of claim 1, wherein the controller is configured to control, in the torque management mode, the velocity of the motor in accordance with the manipulative variable of the trigger switch until the predetermined condition is satisfied.

7. The electric tool system of claim 1, wherein the controller is configured to, when finding the predetermined condition satisfied, perform control to change the velocity of the motor stepwise in multiple stages into the restriction value.

8. The electric tool system of claim 1, wherein the controller is configured to, when finding the predetermined condition satisfied, perform control to change the velocity of the motor in a single stage into the restriction value.

9. The electric tool system of claim 1, wherein the predetermined condition further includes a condition that the velocity of the motor be equal to or greater than the restriction value.

10. The electric tool system of claim 9, wherein the controller is configured to, even when only one of a first condition or a second condition is satisfied and then only the other of the first and second conditions is satisfied, decide that the predetermined condition fail to be satisfied, the first condition being a condition that the torque value reach the threshold value, the second condition being a condition that the velocity of the motor become equal to or greater than the restriction value.

11. The electric tool system of claim 1, wherein the controller is configured to, when the torque value reaches the upper limit value, make the motor stop running.

12. A control method for controlling an electric tool system, the electric tool system including: a motor; an output shaft to be coupled to a tip tool; a transmission mechanism configured to transmit motive power of the motor to the output shaft; an acquirer configured to acquire, based on a current flowing through the motor, a torque value related to output torque provided by the tip tool; and a trigger switch configured to accept an operating command entered by a user, the control method comprising:

controlling the motor in a torque management mode in which the motor is controlled in accordance with the operating command entered through the trigger switch and the torque value acquired by the acquirer is prevented from exceeding an upper limit value, controlling, when finding a predetermined condition satisfied in the torque management mode, the motor to forcibly turn a velocity of the motor into a predetermined restriction value irrespective of a manipulative variable of the trigger switch, the predetermined condition including a condition that the torque value acquired by the acquirer reach a threshold value smaller than the upper limit value, and controlling, when finding that the torque value acquired by the acquirer reaches the upper limit value after the predetermined condition is satisfied in the torque management mode, the motor to stop running.

13. A non-transitory storage medium storing a program designed to cause one or more processors to perform the control method of claim 12.

* * * * *